April 15, 1952     E. M. WILLIAMS ET AL     2,592,631
PULSE ANALYZER
Filed July 31, 1944
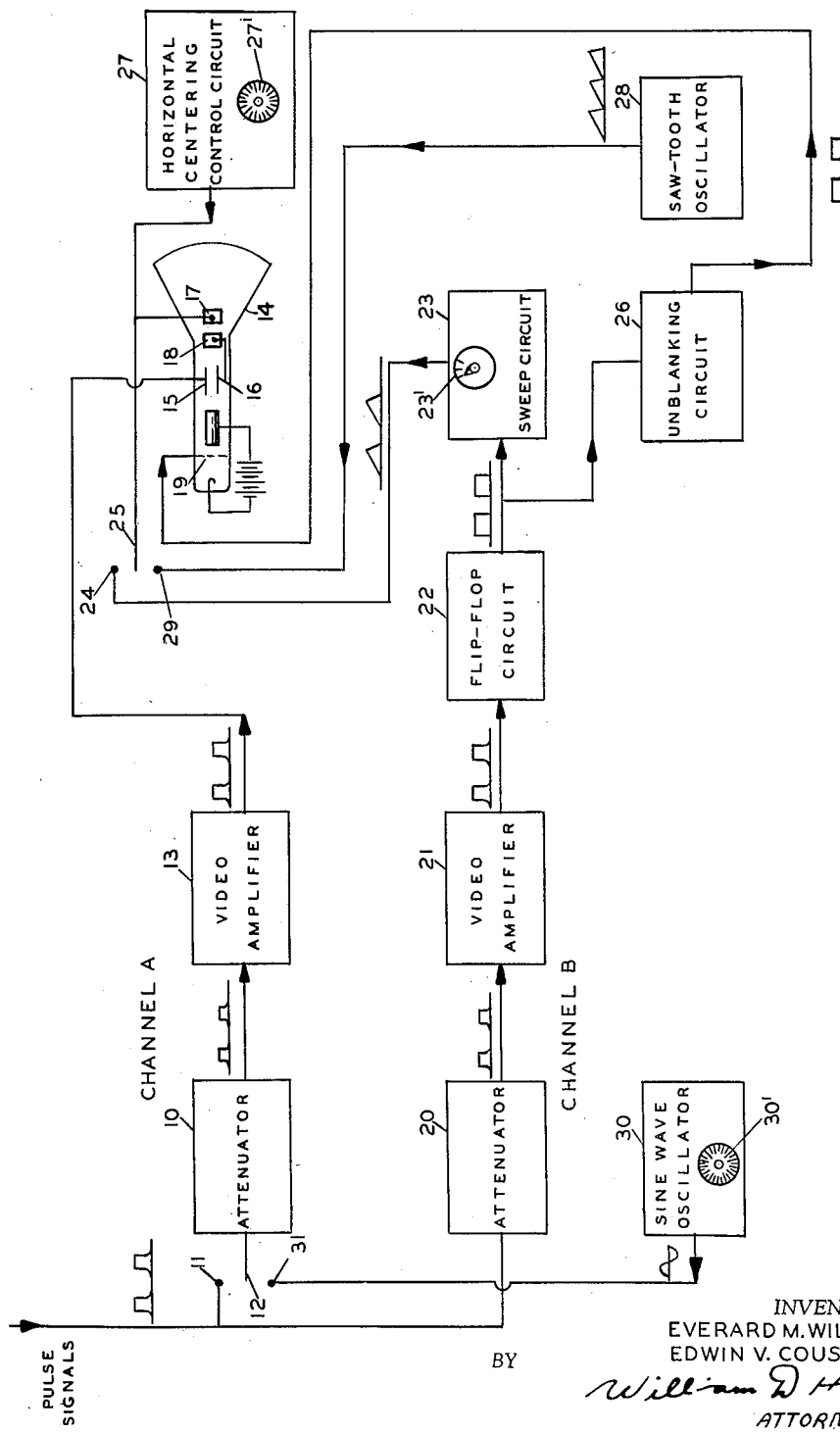
INVENTOR.
EVERARD M. WILLIAMS
EDWIN V. COUSY
BY William D Hall
ATTORNEY Patented Apr. 15, 1952

2,592,631

UNITED STATES PATENT OFFICE 2,592,631

PULSE ANALYZER

Everard M. Williams and Edwin V. Cousy,
Dayton, Ohio

Application July 31, 1944, Serial No. 547,474

4 Claims. (Cl. 175—183)

(Granted under the act of March 3, 1883, as
amended April 30, 1928; 370 O. G. 757)

The invention described herein may be manufactured and used by or for the Government for governmental purposes, without the payment to us of any royalty thereon.

This invention relates in general to systems and devices used to analyze electrical wave forms, and more particularly to those systems and devices used to analyze high frequency pulse signals.

It is an object of our invention to provide a system and device which will enable an operator to quickly and easily analyze a plurality of simultaneously transmitted electrical wave forms.

It is another object of our invention to provide a system and device which will enable an operator to quickly and easily determine the pulse duration, pulse repetition rate, and pulse shape of a plurality of simultaneously received pulse signals.

It is a further object of our invention to provide an electrical wave form analyzer that may be used in conjunction with a conventional receiver.

It is still another object of our invention to provide a pulse analyzer system that is compact and simple of operation.

These and other objects are obtained by the method and novel arrangement of parts hereinafter described and illustrated in the accompanying drawing wherein is disclosed a block diagram of our invention.

In general, our system utilizes a plurality of channels that may be switched into various arrangements in order to determine the pulse width, pulse repetition frequency, and the pulse shape of a received pulse signal or signals.

In order to observe the shape and to measure the width of a received pulse, the received pulse signal is fed in one channel through an attenuator and a video amplifier to the vertical deflecting plates of a cathode ray tube. The input is also fed into another channel through an attenuator, and a video amplifier to trigger a flip-flop circuit which operates a sweep circuit for the horizontal deflecting plates of the cathode ray tube. The pulse width may then be measured by applying a deflection or centering voltage of sufficient magnitude to the horizontal deflecting plates of the cathode ray tube to move the viewed pulse through its width on the screen. By calibrating the centering voltage control in units of time, the duration of the pulse may be indicated directly.

In order to determine the pulse repetition frequency of a received pulse signal, a periodic voltage, such as a calibrated sine wave voltage, is impressed on the vertical deflecting plates of the cathode ray tube instead of the received pulse signal, and the received pulse signal is utilized to operate the sweep circuit by means of the flip-flop circuit. The sine wave frequency is varied until the trace on the screen of the cathode ray tube is stationary. The repetition frequency of the received pulse is then a direct function of the frequency of the sine wave oscillator.

Our system may also be used as an ordinary oscilloscope by using a sawtooth oscillator for the horizontal sweep voltage instead of the received pulse-triggered sweep. The received pulse is then amplified and applied to the vertical deflecting plates of the cathode ray tube in the usual manner.

Referring to the block diagram of our invention illustrated in the drawing, it is seen that the input to the system, which may be the output of a conventional receiver having a wide tuning range and capable of receiving pulse signals, may be branched off into two channels, A and B. The input to channel A is connected to an attenuator 10 through a contact 11 of a switch 12. The output of the attenuator 10 is fed through a video amplifier 13 directly to one of the vertical deflecting plates 15 of a cathode ray tube 14. If desired, a delay circuit may be introduced between the output of the video amplifier 30 and the vertical deflecting plate 15.

The input to channel B is fed directly through an attenuator 20, a video amplifier 21 to trigger a flip-flop circuit 22. The pulse output of the flip-flop circuit 22 is utilized to operate a sweep circuit 23. The sweep circuit 23 is preferably linear and may have several different sweep speeds, one of which may be selected by the control switch 23'. The speed of the horizontal sweep is independent of the repetition rate of the incoming pulse signals. The duration of the horizontal sweep, which may be selected by the control switch 23', should be longer than the duration of the pulse being analyzed. The sweep voltage output from the sweep circuit 23 is connected to a contact 24 of a switch 25, the blade of which is connected to one of the horizontal deflecting plates 17 of the cathode ray tube 14. The output of the flip-flop circuit 22 is also fed into an unblanking circuit 26, the output of which is fed to the grid 19 of the cathode ray tube 14, causing the cathode ray tube 14 to become unblanked each time a pulse is received. The output of a horizontal centering control circuit 27 is connected to the horizontal deflecting plate 17 of the cathode ray tube 14. The output of a sawtooth oscillator 28 is connected to the contact 29 of switch 20. By placing the blade of the switch 25 on the contact 29, the output of the sawtooth oscillator 28 will be fed to the horizontal deflecting plate 17 of the cathode ray tube 14.

The output of a periodic voltage generator, such as a sine wave oscillator 30, is connected to a contact 31 of the switch 12, whereby positioning of the blade of the switch 12 on the contact 31 will permit the output of the sine wave oscillator 30 to be fed through the attenuator 10 and the video amplifier 13 to the vertical deflecting plate 15 of the cathode ray tube 14. In the cathode ray tube 14, the horizontal deflecting plate 18 may be connected to the vertical deflecting plate 16, as shown in the diagram; or, plate 18 may be connected to plate 17 through a phase inverter, and plate 16 connected to plate 15 through a phase inverter in the usual manner.

Wtih the switch 12 placed on the contact 11, and the switch 25 placed on the contact 24, our system may be used to measure the pulse width and also to show the pulse shape of a received pulse signal. The received pulse signal enters the attenuator 10, is amplified in the video amplifier 13, and is then applied to the vertical deflecting plate 15 of the cathode ray tube 14. The received pulse signal also enters the attenuator 20 and is amplified in the video amplifier 21. The pulse output of the video amplifier 22 triggers the flip-flop circuit 22, which produces an operation pulse to initiate the sweep circuit 23. Since the repetition rate of the pulse output of the flip-flop circuit 22 is the same as that of the received pulse, the sweep circuit 23 is operated in synchronism with the received pulse signal. The output of the sweep circuit 23 is then fed to the horizontal deflecting plate 17 of the cathode ray tube 14. The output of the flip-flop circuit 22 also initiates operation of the unblanking circuit 26. The output of the unblanking circuit 26 is connected to the grid 19 of the cathode ray tube 14. The cathode ray tube 14 is normally blanked between incoming pulses in order to reduce the possibility of interfering traces and the display of the return portion of the horizontal sweep. Thus each incoming pulse initiates a sweeping and unblanking operation in such a manner that these operations are synchronized with the received pulse signals.

The operation of the system thus far will cause a stationary trace of the received pulse to appear on the screen of the cathode ray tube 14, giving an accurate reproduction of the received pulse shape. As stated previously, the horizontal centering control circuit 27 generates a voltage that is applied to the horizontal deflecting plate 17. This voltage may be varied by a control 27' that is calibrated directly in units of time. Thus, by operating the control 27', a deflecting voltage is applied to the horizontal deflecting plate 17 of the cathode ray tube 14 which will cause the trace to move horizontally across the screen of the cathode ray tube 14. If a vertical line or other indicating means is provided on the face of the cathode ray tube 14, the centering control 27' may first be operated to line up the leading edge of the pulse on the vertical indicator line on the face of the cathode ray tube 14. The centering control 27' is then adjusted to bring the trailing edge of the pulse into coincidence with the vertical indicator line, and the pulse duration may be read directly from the control 27' that is calibrated in units of time.

In order to place the system into operation for the purpose of determining the repetition frequency of received pulse signals, the switch 12 is placed on contact 31, and the switch 25 is placed on contact 24. The received pulse signals are fed through the attenuator 20, the video amplifier 21 and thence into the flip-flop circuit 22, the pulse output of which operates the sweep circuit 23 and the unblanking circuit 26.

The output of the sweep circuit 23 is fed to the horizontal deflection plate 17 of the cathode ray tube 14. The output of the flip-flop circuit 22 is also fed to the unblanking circuit 26, the output of which is connected to the grid 19 of the cathode ray tube 14. This portion of the circuit operates in an identical manner to that explained above in the use of this portion of the system in determining the width of the received pulse signals. Instead of the input pulse signals being fed through the attenuator 10 and the video amplifier 13 to the vertical deflecting plate 15 of the cathode ray tube 14, the output of the periodic voltage generator, such as calibrated sine wave oscillator 30 is fed through switch 12, the attenuator 10, and the video amplifier 13 to the vertical deflecting plate 15 of the cathode ray tube 14. The sine wave oscillator 30 is a carefully calibrated oscillator that may have a range of, for example, fifty to fifteen thousand cycles per second. By varying the frequency of the sine wave oscillator 30 until a fixed trace is obtained on the viewing screen, the repetition frequency of the received pulse signals can be determined from the oscillator frequency. The sine wave oscillator 30 is provided with a control 30' that is calibrated in frequency so that the pulse repetition rate of the received signals may be read directly.

In order to place the system into operation as an ordinary oscilloscope, the switch 12 is placed on the contact 11, the switch 25 is placed on the contact 29, and the horizontal centering circuit control 27' is set for zero voltage. This operation substitutes the output of the sawtooth oscillator 28 for the output of the sweep circuit 23 in channel B. The sawtooth oscillator circuit 28 may be of a conventional type which can provide a horizontal sweep within the range of from twenty to twenty thousand cycles per second. The input pulse signals are fed through the attenuator 10 and the video amplifier 13 to the vertical deflecting plate 15 of the cathode ray tube 14. The system thus may be used as an ordinary oscilloscope for routine examination of the received pulse signals, if desired. With the system arranged as an ordinary oscilloscope, it is possible to determine whether or not the repetition rate or frequency of the incoming pulse signals is fixed or is varying.

The flip-flop circuit 22 may be any conventional flip-flop circuit that will be triggered by the incoming pulses and produce output pulses whose leading edges are synchronous with the leading edges of the incoming pulses, and whose pulse duration is greater than and independent of the incoming pulses.

One of the advantages of this system is that the repetition frequency of the received pulse signal may be determined regardless of the number of different pulse signals which may be picked up by the receiver, and whose output is being analyzed. This will be so since, in general, no two pulse-modulated transmitters will have exactly the same pulse repetition frequency, and the cathrode ray tube trace of any one signal may be held stationary on the cathode ray tube screen by a careful adjustment of the sine wave oscillator frequency, while the other received signal will continue to move across the cathode ray tube screen in one direction or the other, depending upon whether the repetition frequencies of these pulse-modulated signals are higher or lower than that of the particular pulse-modulated signal being examined.

Our system may be used for analyzing other types of repetitive electrical wave forms in addition to those present in pulse-modulated signals.

The above description is to be considered as illustrative and not limiting the invention of which modifications may be made without departing from the scope of the invention as set forth in the appended claims.

Having thus described our invention, we claim:

1. A system for determining the pulse repetition frequency of pulse signals, comprising a cathode ray tube having horizontal and vertical deflecting plates, means to transform said pulse signals into operating pulses of given duration whose leading edges are synchronous with the leading edges of said pulse signals, said given duration being independent of said pulse signals, a horizontal sweep circuit, means utilizing said operating pulses to operate said sweep circuit in synchronism with the said operating pulses, means for generating a periodic voltage, means for applying said periodic voltage to said vertical deflecting plates, means to continuously vary the frequency of said periodic voltage until a stationary vertical trace appears on the screen of said cathode ray tube, and means for indicating the frequency of said periodic voltage.

2. A system for determing the pulse repetition frequency of pulse signals, comprising a normally blanked cathode ray tube having horizontal and vertical deflecting plates, means to transform said pulse signals into operating pulses of given duration whose leading edges are synchronous with the leading edges of said pulse signals, said given duration being independent of said pulse signals, a horizontal sweep circuit, means utilizing said operating pulses to operate said sweep circuit in synchronism with the said operating pulses, an unblanking circuit, means utilizing said operating pulses to operate said unblanking circuit in synchronism with said operating pulses, means for generating a periodic voltage, and means for applying said periodic voltage to said vertical deflecting plates, means to continuously vary the frequency of said periodic voltage until a stationary vertical trace appears on the screen of said cathode ray tube, and means for indicating the frequency of said periodic voltage.

3. A method of determining the pulse repetition frequency of pulse signals by the utilization of a cathode ray tube having a screen, the steps comprising initiating the generation of a linear sweep voltage in response to each of the pulse signals, said sweep voltage having a given duration which is independent of said pulse signals, deflecting the cathode ray of said tube along one coordinate in accordance with said sweep voltage, generating a periodic voltage of known frequency, deflecting the cathode ray of said tube along a second coordinate in accordance with said periodic voltage, varying said known frequency until a stationary trace appears upon the screen, at which time the frequency of said periodic voltage indicates said pulses repetition frequency.

4. A method of determining the pulse repetition frequency of pulse signals by the utilization of a cathode ray tube having a normally blanked cathode ray and a screen, the steps comprising initiating the generation of a linear sweep voltage and a square wave voltage in response to each of the pulse signals, said linear voltage and square wave voltage having the same given duration, said duration being independent of the pulse signals deflecting the cathode ray of said tube along one coordinate in accordance with said sweep voltage, and unblanking said cathode ray in accordance with said square wave voltage, generating a periodic voltage of known frequency, deflecting the cathode ray of said tube along a second coordinate in accordance with said periodic voltage, varying said known frequency until a stationary vertical trace appears upon the screen, at which time the frequency of said periodic voltage indicates said pulse repetition frequency.

EVERARD M. WILLIAMS.
EDWIN V. COUSY.

REFERENCES CITED

The following references are of record in the file of this patent:

UNITED STATES PATENTS

| Number | Name | Date |
|---|---|---|
| 1,916,782 | Crossley | July 4, 1933 |
| 1,939,434 | Busse | Dec. 12, 1933 |
| 2,221,115 | Shepard | Nov. 12, 1940 |
| 2,272,768 | Crosby | Feb. 10, 1942 |
| 2,283,616 | Slonczewski et al. | May 19, 1942 |
| 2,286,894 | Browne et al. | June 16, 1942 |
| 2,293,135 | Hallmark | Aug. 18, 1942 |
| 2,315,377 | Poch | Mar. 30, 1943 |
| 2,315,945 | Downey | Apr. 6, 1943 |
| 2,355,363 | Christaldi | Aug. 8, 1944 |
| 2,426,721 | Adams | Sept. 2, 1947 |
| 2,431,766 | Miller et al. | Dec. 2, 1947 |
| 2,440,263 | Grieg | Apr. 27, 1948 |

FOREIGN PATENTS

| Number | Country | Date |
|---|---|---|
| 532,392 | Great Britain | Jan. 23, 1941 |

OTHER REFERENCES

Freeman, Electrical Review, January 7, 1944, pages 12, 13, 14.

Stinchfield, Publication No. ST-28, December 1934, published by RCA Radiotron Company, Inc., Harrison, N. J., pages 3 and 16–18.